(No Model.)
H. M. RABUN.
FRUIT PICKER.
No. 406,768. Patented July 9, 1889.
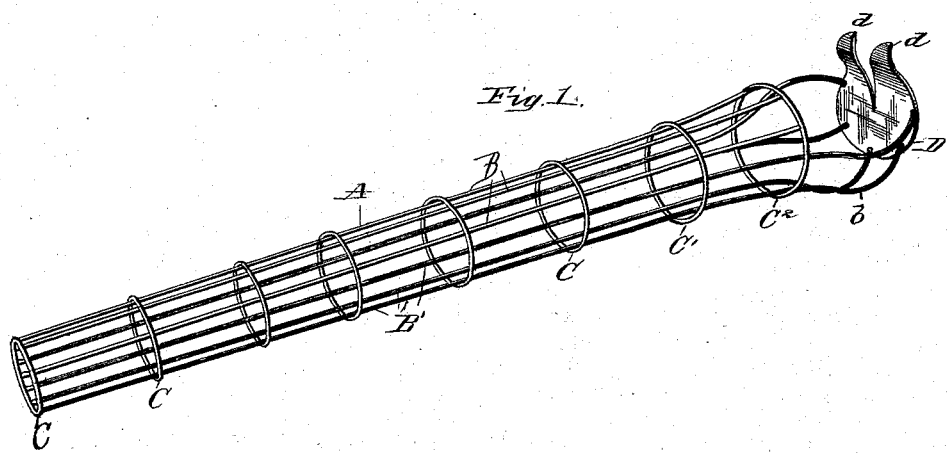
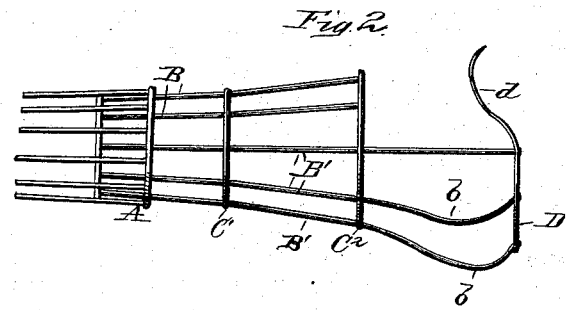
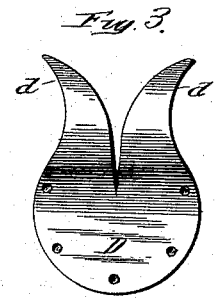
WITNESSES
INVENTOR
Hugh M. Rabun

UNITED STATES PATENT OFFICE.

HUGH M. RABUN, OF BROOKLYN, ALABAMA.

FRUIT-PICKER.

SPECIFICATION forming part of Letters Patent No. 406,768, dated July 9, 1889.

Application filed January 9, 1889. Serial No. 295,872. (No model.)

*To all whom it may concern:*

Be it known that I, HUGH M. RABUN, a citizen of the United States, residing at Brooklyn, in the county of Conecuh and State of Alabama, have invented certain new and useful Improvements in Fruit-Pickers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to fruit-pickers, and has for its object to provide a device for the purpose described which will be simple, durable, light, and convenient to handle.

The improvement consists in the peculiar construction and combination of the parts, which will be hereinafter more fully described and claimed, and shown in the annexed drawings, in which—

Figure 1 is a perspective view of a fruit-picker embodying my invention; Fig. 2, a side view of the upper part of the device, and Fig. 3 a top plan view of the cutting-plate.

The handle A is tubular, to serve as a conveyer to guide the fruit to the hand or to a suitable receptacle placed at its lower end, and is composed of a series of longitudinal rods B and B' and inclosing rings or bands C. The tubular handle increases in size near its upper end, and the two upper bands C' and C² are made larger than the other bands C to adapt them to the increase in the size of the handle. The cutting-plate D is circular in form for about three-fourths of its circumference, the other one-fourth being elongated and curving inwardly and then outwardly to form the opposing blades $d$ $d$. The outer ends of these blades curve outwardly in opposite directions to better admit of the flaring of the cutting-edges, whereby the stems of the fruit are guided between them readily. The upper ends of some of the rods B' are attached to the cutting-plate, and that portion $b$ of these rods between the said plate and the upper band C² curves outwardly and then inwardly to receive the fruit. The rods B, below the blades $d$ $d$, do not extend above the band C², thereby leaving an open space for the reception of the fruit.

The bands encircle the rods and are secured to them in any well-known manner, so as not to interrupt the smoothness of the rods on their inner sides, and, like the rods, are made of suitable material—such as rattan, willow, wires, &c.—the object being to produce a skeleton or open tubular handle which will be light and durable and convenient to operate.

The handle may be of one length, or may be composed of two or more sections, which will have their ends fitted together after the well-known manner of fitting tubular joints together, so it can be lengthened or shortened at will.

The operation of the device is manifest to one skilled in the use of fruit-pickers. The fruit, entering the tube below the cutting-plate and the stem being caught between the two shear-blades $d$ $d$, is severed from the branch by a quick movement of the handle and gravitates through the handle to the hand or receptacle placed to receive it.

Having thus described my invention, what I claim, and desire to secure by Letters Patent, is—

1. The herein-described fruit-picker, composed of longitudinal rods B and B' and inclosing rings or bands for holding the rods together, the rods B', extended beyond the ends of the rods B and having the cutting-plate attached to said extended rods, substantially as shown.

2. The herein shown and described fruit-picker, composed of longitudinal rods B and B', the latter of which are extended beyond the ends of the rods B and have the extended portions $b$ curved first outwardly and then inwardly, rings encircling the said rods, and the cutting-plate attached to the ends of the extended portions $b$ and having one side elongated and curving inwardly and outwardly to form blades, substantially as described.

In testimony whereof I affix my signature in presence of two witnesses.

HUGH M. RABUN.

Witnesses:
W. N. BRAWNER,
W. Y. JOHNSTON.